United States Patent [19]

Pfitzenmaier

[11] Patent Number: 5,542,590
[45] Date of Patent: Aug. 6, 1996

[54] THEFT RESISTANT POUCH FOR USE IN A MOTOR VEHICLE

[76] Inventor: Shirley L. Pfitzenmaier, 252 SW. 23rd St., Fort Lauderdale, Fla. 33315

[21] Appl. No.: 324,102

[22] Filed: Oct. 14, 1994

[51] Int. Cl.$^6$ ...................................................... B60R 7/00
[52] U.S. Cl. ........................ 224/275; 224/563; 150/102; 190/101; 24/633
[58] Field of Search ..................... 224/275, 563; 150/101, 102, 123, 118, 115, 120; 190/903, 101, 26; 24/633; 297/188.2

[56] References Cited

U.S. PATENT DOCUMENTS

| | | | |
|---|---|---|---|
| 257,003 | 4/1882 | Harris | 190/101 |
| 338,846 | 3/1886 | Kimber | 190/101 |
| 2,898,609 | 8/1959 | Storie | 5/419 |
| 3,632,029 | 1/1972 | Sonner | 224/275 |
| 4,731,912 | 3/1988 | Boriskie et al. | 24/633 |
| 4,905,855 | 3/1990 | Troiano et al. | 220/3 |
| 4,961,251 | 10/1990 | Smith | 24/633 |
| 5,285,833 | 2/1994 | Haxby | 150/102 |

FOREIGN PATENT DOCUMENTS 2266708 11/1993 United Kingdom .................. 224/275

Primary Examiner—Linda J. Sholl
Attorney, Agent, or Firm—Malin, Haley, DiMaggio & Crosby, P.A.

[57] ABSTRACT

The present invention contemplates an articles storage pouch designed to attach to an automobiles existing safety-belt hardware for securing articles thereby deterring theft and preventing the enclosed articles from shifting about the passenger compartment. The invention comprises a storage pouch for stowing articles adjacent to a driver on an automobile seat. The pouch is fabricated from a flexible durable material and incorporates an opening, defined by a rigid frame member, for preventing unwanted access to the contents when the storage pouch is closed. One opening member incorporates a slot through which a closure strap, attached at one end to the opposing opening member may be inserted for drawing the pouch opening closed. The closure strap terminates in a male seat-belt connector for engaging a female seat-belt connector which is anchored to the automobile frame thereby securing the pouch on the car seat.

2 Claims, 2 Drawing Sheets

THEFT RESISTANT POUCH FOR USE IN A MOTOR VEHICLE

BACKGROUND OF THE INVENTION

1. Field of the Invention

The present invention relates to theft resistant carrying cases, and more particularly to an articles pouch, that may be locked closed and secured to automobile safety belt hardware.

2. Description of the Prior Art

When traveling, motorists often store articles of personal property loosely within the automobile's passenger compartment. Many such items are of some value and at risk of theft when left in a vehicle. While locking the car doors offers some theft deterrence, thieves have been known strike quickly by smashing the window of an unattended car, grabbing a particular item, and rapidly fleeing the scene. In certain parts of the country even occupied vehicles have been the subject of these smash and grab tactics.

While it is possible to deter theft of personal property by stowing property in the trunk, this is not always feasible: Often times the trunk of a car may be full of various items; or a trunk may not exist as is the case with station wagons and vans. In addition, other locations such as the glove compartment or the space under the seats are limited and may be too small to accommodate larger items hidden from view.

Another problem experienced by motorists who transport personal property in vehicles is that, unless the property is stowed properly, it tends to move, slide, or tip over, as a result of the normal motions encountered while driving. Hence, valuable items are often damaged by impact within the vehicle interior caused by routine vehicle motion, or more violent sudden jarring experienced during heavy breaking. In addition, items, such as canisters or boxes containing smaller items or liquids, are likely to spill their contents if tipped.

The prior art reveals a number of devices directed toward solving the aforementioned problems. For example, U.S. Pat. No. 3,014,759 issued to Bing, discloses an AUTOMOBILE UTILITY BAG consisting of a compartmented utility bag, for stowing articles, that attaches to an automobile interior. The device incorporates a soft, article-protecting compartment liner and is attached by straps having hooks for anchoring the device in place on an automobile seat. However, since installing the device requires an elaborate network of straps, the device is not easily removed. In addition, the device has a large flap of material that covers either the automobile seat or back support cushions, a feature that is likely objectionable to many motorists.

U.S. Pat. No. 3,388,886, issued to Tucker, discloses a PACKAGE TETHERING DEVICE for use in securing packages, handbags and the like on motor vehicle seats comprising an elongated, cordlike tethering member anchored to a vehicle seat. The device is adjustable and has a pair of ends each incorporating a clamp device for securing a package or other article. The tether, however, is susceptible to tangling, thereby limiting the appeal of such a device. In fact such a device may prove dangerous should the tether become entangle about the driver's legs. In addition, the device merely secures an article and does not shield it from view thereby limiting its effectiveness as a theft deterrent.

A variety of other devices directed generally toward securing carrying cases. Typical among these are the following: U.S. Pat. No. 4,545,414, issued to Baum, disclosing a BELT-SUPPORTED CAMERA BAG; U.S. Pat. No. 4,792,026, issued to Dimmick et al., disclosing an APPARATUS FOR LOCKING A CARRYING CASE; and, U.S. Pat. No. 5,285,833, issued to Haxby, disclosing a THEFT RESISTANT PURSE. None of the aforementioned devices, however, are directed toward a theft deterrent carrying case for automobiles that secures articles by attaching to the existing automobile seat belt hardware.

Thus, there exists a need for an automobile carrying case that locks articles within an enclosure and is secured in the passenger compartment by the existing seat-belt hardware. It is, therefore, to the effective resolution of the aforementioned problems and shortcomings that the present invention is directed.

SUMMARY OF THE INVENTION

The present invention contemplates an articles storage pouch designed to attach to the existing safety-belt hardware of an automobile for securing articles thereby deterring theft and preventing the enclosed articles from shifting about the passenger compartment. The invention comprises a storage pouch for securely stowing articles adjacent to a driver on an automobile seat. The pouch is preferably fabricated from a flexible durable material and incorporates an opening, which may be defined by a rigid or semi-rigid frame member, or may be flaccid, for preventing unwanted access to the contents when the storage pouch is closed. One side of the opening incorporates a slot through which a closure strap, attached at one end to the opposing side of the opening may be inserted for drawing the pouch opening closed. The closure strap terminates in a male seat-belt connector for engaging the existing female seat-belt connector which is anchored to the automobile frame thereby securing the pouch on the car seat.

To use the instant invention, a user opens the pouch, places the desired articles inside, closes the pouch opening by inserting the closure strap through the aperture and anchors the pouch by inserting the male connector existing on the closure strap end to an automobile's female seat-belt hardware. As a result, the case is secured in place thereby preventing the enclosed articles from shifting about the automobile interior while also preventing access to the articles thereby deterring theft by concealing the enclosed articles and anchoring the pouch to the automobile seat-belt hardware.

Therefore it is an object of the instant invention to provide an articles storage case for use with an automobile.

It is a further object of the instant invention to provide an articles storage case for use with an automobile that anchors to the automobiles existing seat-belt hardware.

Still another object of the present invention is to provide a theft deterrent articles storage case for use with an automobile that locks closed while anchored to the automobile's seat-belt hardware.

Yet another object of the instant invention is to provide an articles storage case that anchors to an automobile's existing seat-belt hardware thereby preventing the articles from shifting around the automobile interior.

In accordance with these and other objects which will become apparent hereinafter, the instant invention will now be described with particular reference to the accompanying drawings.

DESCRIPTION OF THE PREFERRED EMBODIMENTS

Figure 1:
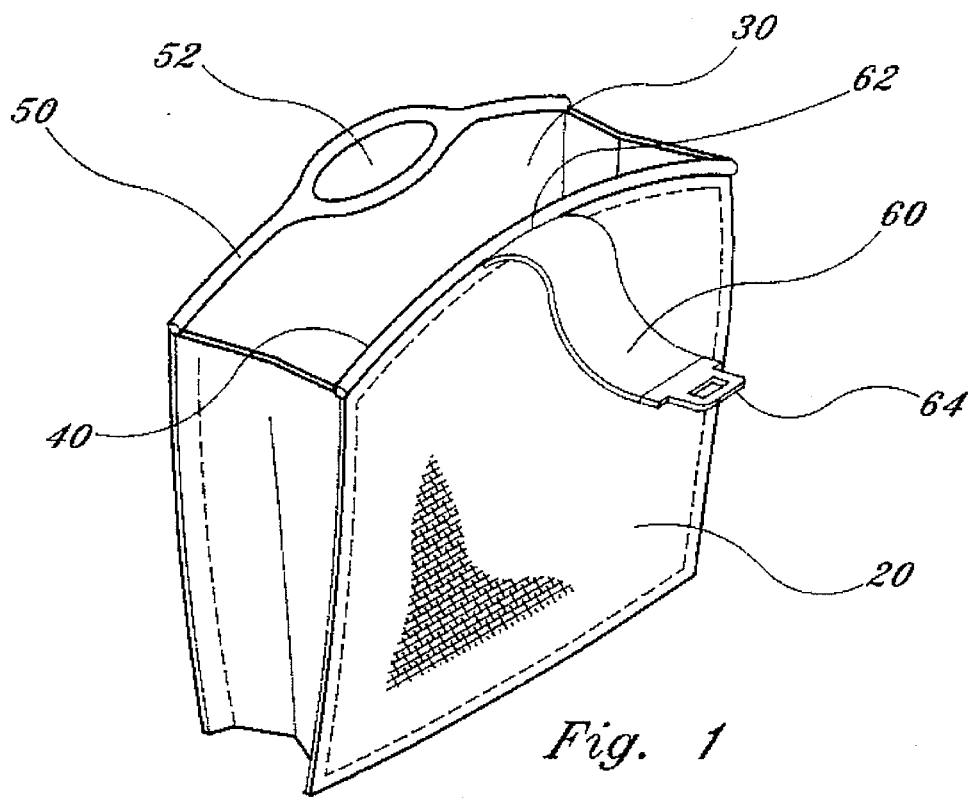
FIG. 1 depicts the instant invention in an open configuration.
Figure 2:
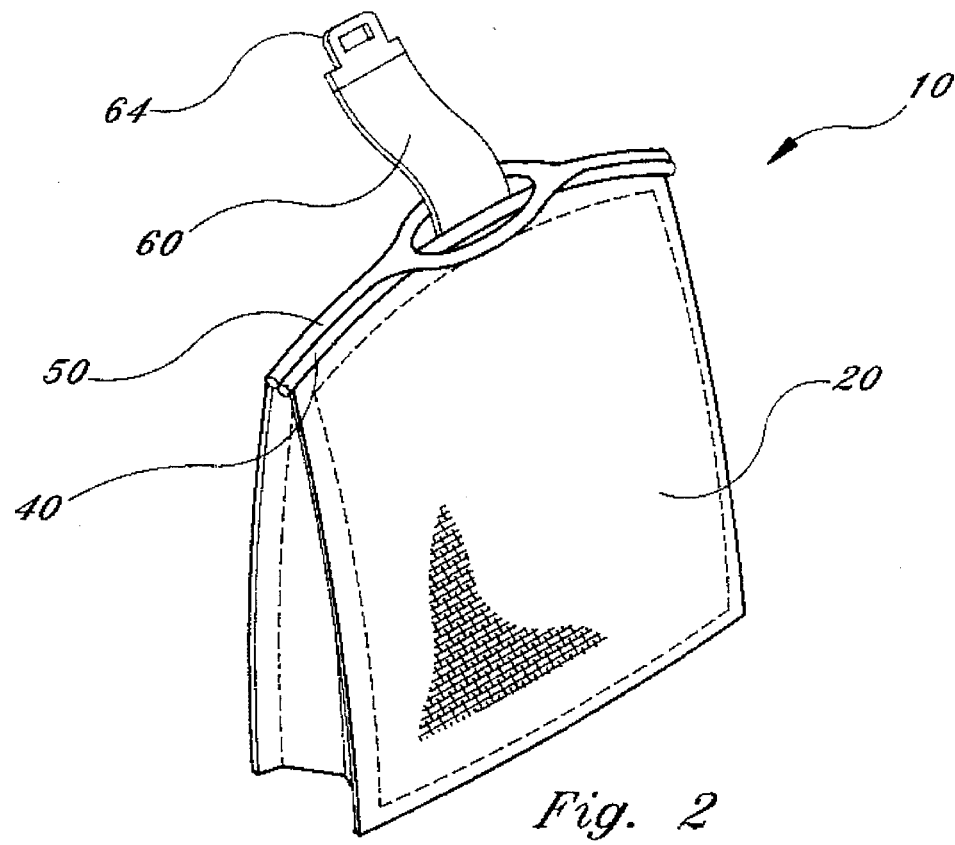
FIG. 2 depicts the instant invention in a closed configuration.

Turning now to the drawings, FIGS. 1 through 5 depict a preferred embodiment of the theft deterrent articles storage pouch of the instant invention generally designated 10. Turning first to FIGS. 1 and 2, the invention includes a pouch body 20 defining an articles storage compartment. In the preferred embodiment, pouch body 20 is fabricated from a flexible and durable opaque fabric for concealing enclosed articles. Other embodiments, however, may be fabricated from transparent or mesh material to enable a user to view the contents. The pouch body 20 conforms to a predetermined size and shape when full and collapses when empty for compact and convenient storage in the glove compartment or under the seat.

Pouch body 20 has an opening 30 for accepting articles for storage therein. Opening 30 is reinforced, along its perimeter, by a pair of opposing elongated rigid members 40 and 50. Rigid members 40 and 50 are configured such that, when closed, members 40 and 50 are aligned substantially adjacent to one another thereby preventing undesired access to enclosed articles as best depicted in FIG. 2. The instant invention contemplates fabricating members 40 and 50 to define a variety of predetermined opening configurations. Furthermore, the opening members 40 and 50 may be hingedly connected (not shown).

Figure 3:
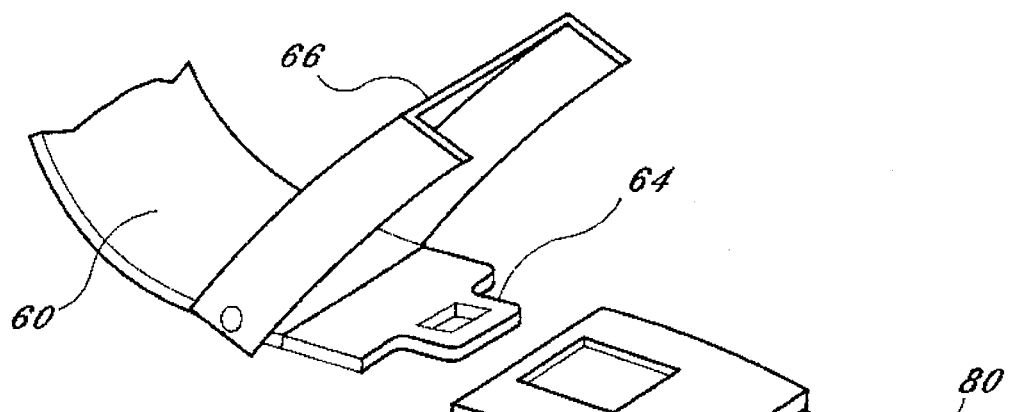
FIG. 3 depicts a partial perspective view detailing an alternate embodiment having a hinged cover plate for concealing the connection hardware.

A closure strap 60 provides a tensioning means for bringing opposing members 40 and 50 together thereby closing case opening 30 for preventing undesired access. Closure strap 60 consists of an elongated flexible fabric strap having a first end 62 attached to elongated opening member 40, and a second, free end, terminating in a male seat-belt connector 64. Rigid opening member 50 incorporates a slotted aperture 52 for accommodating closure strap 60 disposed therein. Closure strap 60 may also incorporate a hinged cover plate 66 located proximate said free end for concealing the connection junction, as best depicted in FIG. 3. The strap-end embodiment depicted in FIGS. 3 and 4 incorporating hinged cover plate 66 functions to conceal the anchoring interconnection, so as to deter a would be thief from attempting to unbuckle pouch 10.

Figure 4:
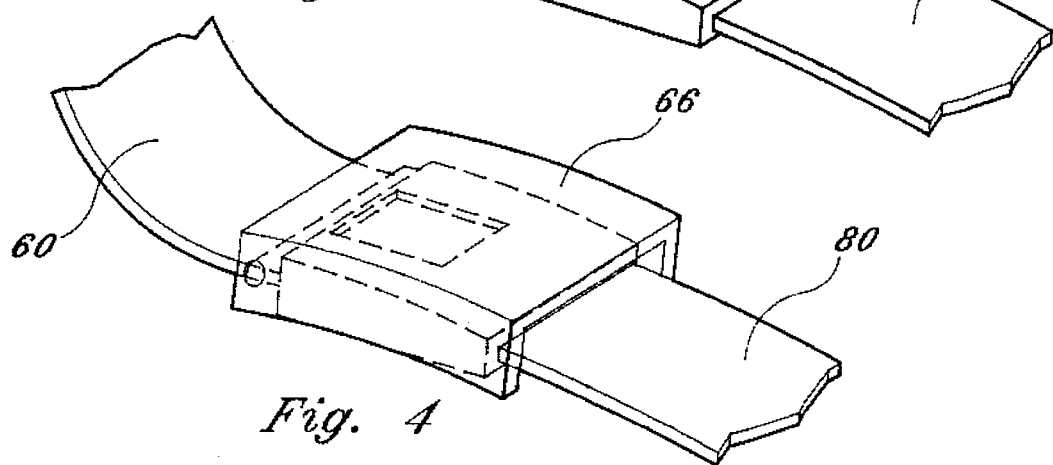
FIG. 4 depicts a partial perspective view detailing the alternate embodiment depicted in FIG. 3 once connected.
Figure 5:
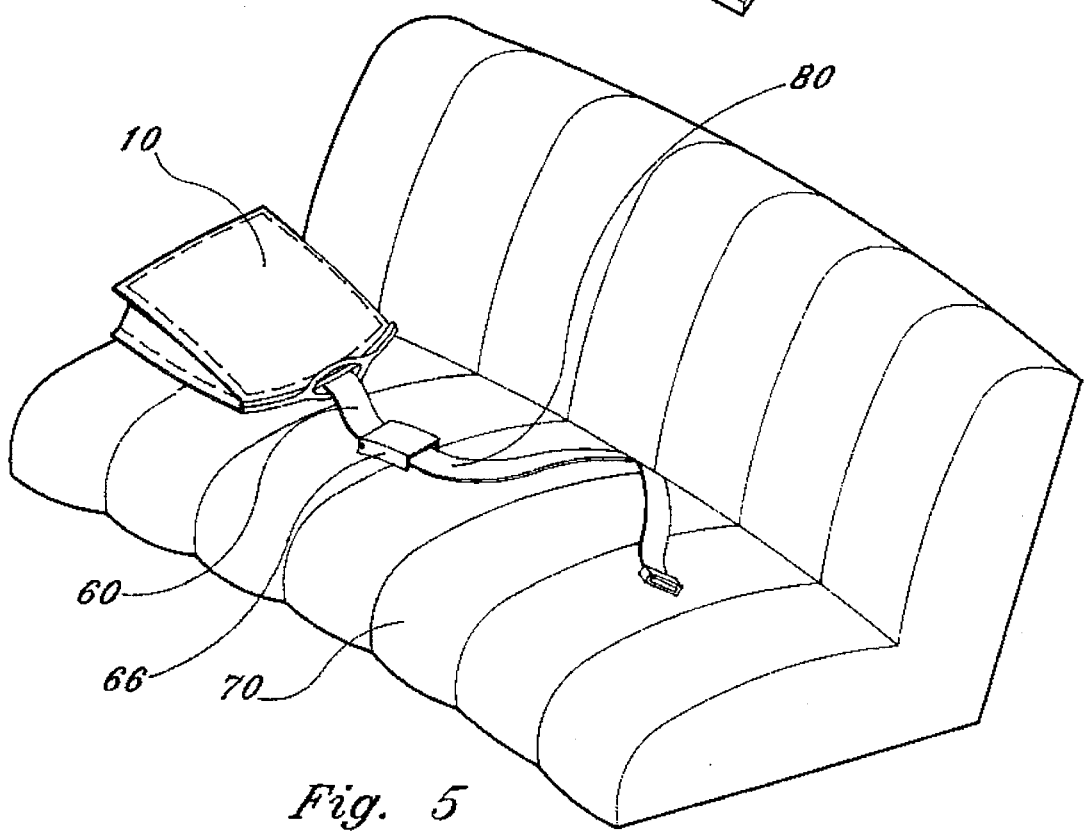
FIG. 5 depicts the instant invention in a closed configuration secured to an automobile seat by safety-belt hardware.

Thus, the instant invention contemplates storing articles by opening the pouch, placing the desired articles inside, threading closure strap 60 through slotted aperture 52 existing on the opposing rigid opening member 50 thereby providing closure tension which results in bringing opening members 40 and 50 together, and anchoring pouch 10 on car seat 70 by inserting male seat belt connector 64 into one of the automobiles available female seat belt connectors 80 as best depicted in FIGS. 3 through 5.

Securing pouch 10 in this manner prevents a would be thief from quickly snatching the pouch and its contents as well as preventing said thief from accessing the pouch interior and removing its contents. An additional benefit that is derived from securing the pouch as described is that the pouch is secured on the car seat and prevented from sliding around the automobile interior.

As is now apparent, access to the pouch contents is gained by disengaging closure strap male connector 64 from the automobile's female seat belt connector 80 in a conventional manner and opening the pouch 10 by separating opening members 40 and 50 such that closure strap 60 exits slotted aperture 52 thereby providing access to the pouch interior.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A theft deterring articles pouch for safely storing articles in an automobile comprising:

a pouch body defining an interior storage space, said pouch body also defining an opening for access to said storage space;

means for reinforcing said pouch opening, said means for reinforcing including first and second rigid members;

means for securing said pouch opening in a closed state, said means for securing including a closure strap and a corresponding strap receiving aperture defined by one of said first or second rigid members;

means for connecting said pouch to an automobile seat including a male seat-belt connector portion attached to an end of said closure strap for mating engagement with a corresponding connector portion fixedly secured to said automobile.

2. A theft deterring articles pouch for safely storing articles in an automobile according to claim 1, wherein said strap further incorporates a hinged cover plate proximate said strap male connector, said cover plate being movable from an open position wherein said male connector is exposed, to a closed position wherein said male connector is concealed.

* * * * *